United States Patent
Shin et al.

(10) Patent No.: US 8,298,503 B2
(45) Date of Patent: Oct. 30, 2012

(54) FILTER TYPE TRAPPING AGENT FOR VOLATILE CESIUM COMPOUND AND TRAPPING METHOD FOR VOLATILE CESIUM COMPOUND THEREOF

(75) Inventors: Jin Myeong Shin, Daejeon (KR); Jang Jin Park, Daejeon (KR); Jae Won Lee, Daejeon (KR); Jeong Won Lee, Daejeon (KR)

(73) Assignees: Korea Atomic Energy Research Institute, Daejeon (KR); Korea Hydro & Nuclear Power Co., Ltd., Seoul (KR)

(*) Notice: Subject to any disclaimer, the term of this patent is extended or adjusted under 35 U.S.C. 154(b) by 145 days.

(21) Appl. No.: 12/871,215

(22) Filed: Aug. 30, 2010

(65) Prior Publication Data

US 2011/0052461 A1    Mar. 3, 2011

(30) Foreign Application Priority Data

Sep. 2, 2009 (KR) .................. 10-2009-0082512

(51) Int. Cl.
*B01D 47/00* (2006.01)
*B01D 53/46* (2006.01)
*B01D 53/56* (2006.01)
*B01D 53/86* (2006.01)
*B01J 8/00* (2006.01)
*C01D 3/08* (2006.01)

(52) U.S. Cl. .................. 423/210; 423/179
(58) Field of Classification Search .............. 423/179, 423/210; 502/400, 407, 415; 95/133, 274, 95/286; 96/108; 55/522, 523

See application file for complete search history.

(56) References Cited

U.S. PATENT DOCUMENTS

| | | | | |
|---|---|---|---|---|
| 4,005,971 A | * | 2/1977 | Knudsen | 425/410 |
| 4,597,083 A | * | 6/1986 | Stenerson | 714/753 |
| 4,900,506 A | * | 2/1990 | Moormann et al. | 376/314 |
| H920 H | * | 5/1991 | Carson et al. | |

FOREIGN PATENT DOCUMENTS

| | | |
|---|---|---|
| KR | 100192128 B1 | 6/1997 |
| KR | 100184254 B1 | 12/1998 |

* cited by examiner

*Primary Examiner* — Colleen Dunn
*Assistant Examiner* — Anthony J Zimmer
(74) *Attorney, Agent, or Firm* — Maier & Maier PLLC

(57) ABSTRACT

A filter type trapping agent for volatile cesium compound and trapping method for volatile cesium compound thereof are provided. More particularly, a filter type trapping agent for volatile cesium compound including silica 40-65% by weight of silica, 15-30% by weight of alumina, 5-15% by weight of iron oxide, 1-15% by weight of molybdenum oxide, 1-10% by weight of chromium oxide, and 1-10% by weight of vanadium oxide and trapping method for volatile cesium compound thereof are provided. Through a filter type trapping agent for volatile cesium compound and a trapping method, only cesium can be selectively separated among the nuclear fission gases. Accordingly, by disposing only the filter where cesium is trapped, the efficiency of an off-gas process improves, expense for disposing filter wastes decreases, and a cesium isotope of the waste filter can be recycled. Therefore, many forms of cesium compound gas are made insoluble efficiently.

7 Claims, 3 Drawing Sheets

FILTER TYPE TRAPPING AGENT FOR VOLATILE CESIUM COMPOUND AND TRAPPING METHOD FOR VOLATILE CESIUM COMPOUND THEREOF

CROSS-REFERENCE TO RELATED APPLICATION

This application is based on and claims priority from Korean Patent Application No. 10-2009-0082512 filed on Sep. 2, 2009, in the Korean Intellectual Property Office, the disclosure of which is incorporated herein in its entirety by reference.

BACKGROUND OF THE INVENTION

1. Field of the Invention

The present invention relates to a filter type trapping agent for volatile cesium compound and a trapping method for volatile cesium compounds thereof.

2. Description of the Related Art

Cesium, the high level radiation gaseous waste, is generated from a spent fuel management process (such as an oxidation process, an electrolysis process, a fluoridation process, and a chlorination process of a nuclear fuel irradiated in nuclear reactors or spent fuel), a spent fuel solidification process, and a high level radiation liquid waste roasting process. It is also generated from a process of roasting the high level radiation liquid waste that results from a reprocessing process, and a solidification process. In many processes dealing with the spent fuel, not only cesium (Cs) but also diverse semi-volatile fission gases like I, Tc, Ru, Te are generated depending on heat processing temperature and air atmosphere. Among these gases, cesium with high level radioactivity and heat radiation should not be released to the environment. Therefore, technology development for selectively trapping cesium with safety is urgently required.

In the conventional art, a condensation method of producing gaseous cesium into fine aerosol particles and removing them using a high efficiency filter was used to effectively remove gaseous cesium. However, the method had a great danger for radiation and the disposal problem was an issue as the method did not involve a technology of trapping the radioactive cesium having a great chemical reaction into a chemically stable form and a substance with high leach resistance. Also, a method has recently been developed for generating fly ash produced by coal-fired steam plants into a filter, making the fly ahs react with gaseous cesium, manufacturing cesium alumino silicate, and trapping cesium. However, quality control could not be made as the composition of fly ash varied depending on change in the kind of coals used in the coal-fired steam plants. That is, producing pollucite ($CsAlSi_2O_6$) is hard because irregular chemical composition occurs when the fly ash is generated into a filter. Furthermore, selectively removing cesium is hard to be achieved because of diverse chemical compositions such as, $CaO$, $MgO$, $TiO_2$, $SO_3$, $Na_2O$, $K_2O$, $BaO$, $PbO$, $MnO_{20}$, included in the fly ash.

Actually, not only cesium but also technetium-99 is simultaneously trapped in the fly ash filter. If technetium-99 as well as cesium is trapped in the fly ash filter, cesium, which is short-lived radionuclide with high level of radioactivity and heat dissipation (137 Cs: 30.2 years) and the technetium which is long-lived radionuclide (99 Tc: 210,000 years) are simultaneously disposed when the waste filter in which the cesium and the technetium are trapped together is permanently disposed. Therefore, effective disposal and recycle of cesium and technetium cannot be anticipated.

Metakaolinite ($Al_2O_3.2SiO_2$), bentonite ($Al_2O_3.4SiO_2.6H_2O$), and pyrophillite ($Al_2O_3.4SiO_2.H_2O$) that exist in nature are also used as cesium trapping source materials. However, clay such as the metakaolinite with mole ratio of Si/Al=1.04, the pyrophillite with 2.07, and the bentonite with 3.53 have chemical compositions unsuitable for generating pollusite ($CsAlSi_2O_6$), a stable form of cesium. In addition, when these materials are generated into a filter, the intensity becomes so weak that the shape is hard to be maintained because have high hygroscopicity. Korean Patent Registration No. 10-0184254 relates to a gaseous cesium (Cs) trapping agent using waste catalyst for fluid catalytic cracking produced during a heavy oil upgrading process in petrochemical plants. However, as the fluid catalytic cracking catalyst contains zeolite absorbing moisture, complete plasticity can not be achieved when generated into a filter. Therefore, it is hard to process and shape the trapping agent into a conveniently-operable filter. In addition, the gaseous cesium is trapped as a powder form after the waste catalyst for fluid catalytic cracking is performed. Therefore, a blockage in the filter wall and pressure drop due to non-oxidation, and low contact efficiency of gas and solid channeling can lead to an operation problem during off-gas treatment. Currently, in order to remove the gaseous cesium by using a fly ash and a waste FCC catalyst, the operation temperature must be maintained at 600-1300 and 500-1000. If the removing work is done in an off-gas treatment system in nuclear power facilities, the off-gas cannot react to low temperature, thus requiring additional heating equipment.

For the sake of completion, when the inventors were conducting research on the method of trapping cesium compound, we developed a method of trapping volatile cesium compound by using a filter type trapping agent including 40-65% by weight of silica, 15-30% by weight of alumina, 5-15% by weight of iron oxide, 1-15% by weight of molybdenum oxide, 1-10% by weight of chromium oxide, and 1-10% by weight of vanadium oxide.

SUMMARY OF THE INVENTION

It is an object of the present invention to provide a filter type trapping agent for volatile cesium compound.

It is the other object of the present invention to provide a trapping method for volatile cesium compound.

According to an aspect of the present invention, there is provided a filter type trapping agent for volatile cesium compound, including 40-65% by weight of silica, 15-30% by weight of alumina, 5-15% by weight of iron oxide, 1-15% by weight of molybdenum oxide, 1-10% by weight of chromium oxide, and 1-10% by weight of vanadium oxide.

According to another aspect of the present invention, there is provided a trapping method for volatile cesium compound produced by a spent fuel treatment process at high temperature, a solidification process, a fluoride manufacturing process, a chloride manufacturing process, a nitride manufacturing process, and a dry process, by using a filter type trapping agent including silica 40-65% by weight of silica, 15-30% by weight of alumina, 5-15% by weight of iron oxide, 1-15% by weight of molybdenum oxide, 1-10% by weight of chromium oxide, and 1-10% by weight of vanadium oxide.

Through a filter type trapping agent for volatile cesium compound and a trapping method, only cesium can be selectively separated among the nuclear fission gases, which makes it possible to dispose only the filter where cesium is trapped. As a result, the efficiency of an off-gas process can improve, expense for disposing filter wastes can decrease, and a cesium isotope of the waste filter can be recycled. Therefore, they can be useful to make many forms of cesium compound gas useless.

BRIEF DESCRIPTION OF THE DRAWINGS

The above and other features and advantages of the present invention will become more apparent by describing in detail preferred embodiments thereof with reference to the attached drawings in which.

DETAILED DESCRIPTION OF THE INVENTION

Figure 1:
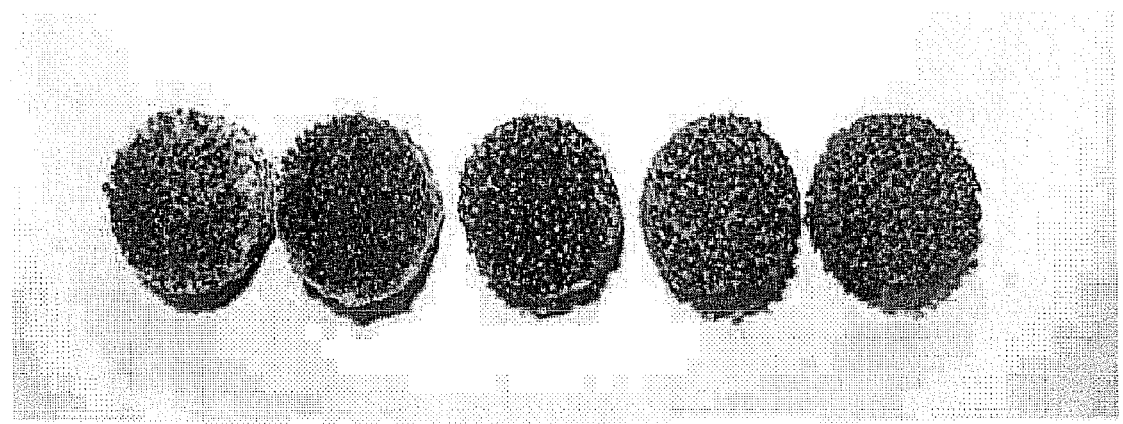
FIG. 1 is a photograph illustrating a trapping agent in a first embodiment after trapping cesium compound with the flow rate of 10 cm/sec, at the temperature of 600, and for 3 hours under air atmosphere according to a second embodiment.

According to an aspect of the present invention, there is provided a filter type trapping agent for volatile cesium compound.

Hereinafter, a detailed description of the present invention is followed.

The filter type trapping agent for volatile cesium compound produced by a nuclear fuel manufacturing process may include 40-65% by weight of silica, 15-30% by weight of alumina, 5-15% by weight of iron oxide, 1-15% by weight of molybdenum oxide, 1-10% by weight of chromium oxide, and 1-10% by weight of vanadium oxide.

In one embodiment, the trapping agent for volatile cesium compound may be formed as a solid filter. The solid filter may take various forms such as ceramic foams, porous spheres, or cylinders. The solid filter requires that the trapping agent components are not scattered. Additionally, superior formability is also necessary. The superior formability can be achieved if the trapping agent has more than certain level of silica, alumina, iron oxide, and molybdenum oxide. In comparison with the powder type trapping agent of the prior art, the filter type trapping agent in one embodiment solve the problems like a blockage in the filter wall due to non-oxidation and pressure drop, thus improving the working environment. Besides, the problem of channeling of the powder type trapping agent can be solved by using the filter type trapping agent with micro-porosity, and the efficiency of trapping off-gas can be improved since gas and solid contact increases.

Furthermore, the filter type trapping agent in one embodiment may be prepared by the elements at 1200-1500. Under 1200, the porous filter shape can not be maintained as the temperature at a calcination process is low. Above 1500, the filter shape is destroyed as the raw material powder particles are melted into hyaline due to high temperature.

In one embodiment, a method for trapping volatile cesium compound produced by a nuclear fuel manufacturing process including a spent fuel treatment process at high temperature, a solidification process, a fluoride manufacturing process, a chloride manufacturing process, a nitride manufacturing process, or a dry process, by using the above-mentioned filter type trapping agent is provided.

Specifically, the volatile cesium compound can be removed by providing the filter type trapping agent to a working place where the gaseous cesium compound to be removed exists, and contacting the trapping agent with the volatile gaseous cesium compound. The desired trapping temperature may be 400-1200. If the trapping temperature is under 400, energy required for the reaction of gaseous cesium and trapping agent is insufficient, leading to failure in trapping reaction. If the temperature exceeds 1200, there could be some problems like corrosion of the system, stability, and operation cost due to high temperature.

In the trapping reaction, cesium compound is selectively trapped at the said temperature, and the trapped cesium compound has a pollucite ($CsAlSi_2O_6$) form. The composition of the trapping agent 40-65% by weight of silica, 15-30% by weight of alumina, 5-15% by weight of iron oxide, 1-15% by weight of molybdenum oxide, 1-10% by weight of chromium oxide, and 1-10% by weight of vanadium oxide may be an optimum condition for selectively trapping only the cesium compound. Therefore, it is possible to trap only the cesium compound regardless of the reaction with technetium, ruthenium, antimony, tellurium among the nuclear fission gases.

Hereinafter, more detailed description of the embodiment is followed by using working examples, provided that the following working examples are only examples written for illustrative purpose, not restricting the present invention concept.

Working Example 1

Trapping Agent for Volatile Cesium Compound

Slurry solution was produced by mixing silica, alumina, iron oxide, molybdenum oxide, chromium oxide, and vanadium oxide, and uniformly mixing this mixture with 0.5% of polyvinyl alcohol used as a bonding agent into the ratio of 50:50 by weight percent. The slurry solution was impregnated 5 times into a polyurethane sponge with 25 ppi (pores per inch), and air was sprayed to remove the remaining slurry. After repeating the slurry impregnation and air spray for five times, a filter was molded through a dry process at temperature of 120 for 6 hours. In order to produce closely assembled polycrystal particles with high intensity, the filter was calcinated at the temperature of 1400 for half an hour, and a trapping agent for volatile cesium compound including 60% by weight of silica, 25% by weight of alumina, 8% by weight of iron oxide, 3% by weight of molybdenum oxide, 2% by weight of chromium oxide, and 2% by weight of vanadium oxide was prepared.

Working Example 2

Trapping Volatile Cesium Compound 1

A Volatile Cesium Compound Produced from Cesium Iodide (Csi) by Using an experimental equipment for gas exhaust was trapped into the trapping agent of the working example 1 at 10 cm/sec, 600, 3 hours under atmospheric environment.

Working Example 3

Trapping Volatile Cesium Compound 2

A volatile cesium compound was trapped using the same method as working example 2, but at 900.

Working Example 4

Trapping Volatile Cesium Compound 3

Gaseous cesium was obtained from 45 g of $CsNO_3$ by using an experimental equipment for gas exhaust at 20 cm/sec, 1000 in a volatile zone, and trapped into the trapping agent located in the trapping zone of the working example 1 at 400, 3 hours.

Working Example 5

Trapping Volatile Cesium Compound 4

A volatile cesium compound was trapped using the same method as working example 4, but at 600.

Working Example 6

Trapping Volatile Cesium Compound 5

A volatile cesium compound was trapped using the same method as working example 4, but at 800.

Working Example 7

Trapping Volatile Cesium Compound 6

A volatile cesium compound was trapped using the same method as working example 6, but for 2 hours.

Working Example 8

Trapping Volatile Cesium Compound 7

A volatile cesium compound was trapped using the same method as working example 4, but at 1000.

Comparison Example 1

Trapping Agent for Volatile Cesium Compound

Slurry solution was prepared by mixing silica, alumina, iron oxide, molybdenum oxide, chromium oxide, and vanadium oxide, and uniformly mixing the resultant 1.0% of polyvinyl alcohol used as a bonding agent into the ratio of 60:40 by weight percent. The slurry solution was impregnated 4 times into a polyurethane sponge with 60 ppi (pores per inch), and air was sprayed to remove the remaining slurry. After repeating the slurry impregnation and air spray for 4 times, a filter has been molded through a dry process at 120, 6 hours. In order to produce closely assembled polycrystal particles with high intensity, the filter was calcinated at 1380 for half an hour, and a trapping agent for volatile cesium compound including 60% by weight of $SiO_2$, 24.2% by weight of $Al_2O_3$, 12.8% by weight of $Fe_2O_3$, 3% by weight of $MoO_3$ with mole ratio of Si/Al=2.0 was obtained.

Comparison Example 2

Trapping Volatile Cesium Compound 8

Gaseous cesium was obtained from 10 g of $CsNO_3$ by using an experimental equipment for gas exhaust at 20 cm/sec, and 1000, and trapped into the trapping agent located in the trapping zone of the working example 1 at 800, 2 hours.

Following table 1 is a summary of the trapping conditions of the working examples 2-8 and the comparison example 2.

TABLE 1

| Examples | Cesium compound obtained from CsI | | Cesium compound obtained from $CsNO_3$ | |
|---|---|---|---|---|
| | Trapping temperature | Hour | Trapping temperature | Hour |
| Working example 2 | 600 | 3 | — | — |
| Working example 3 | 900 | 3 | — | — |
| Working example 4 | — | — | 400 | 3 |
| Working example 5 | — | — | 600 | 3 |
| Working example 6 | — | — | 800 | 3 |
| Working example 7 | — | — | 800 | 2 |
| Working example 8 | — | — | 1000 | 3 |
| Comparison example 2 | — | — | 800 | 2 |

Experiment Example 1

Analyzing the Shape of a Trapping Agent Produced after Trapping Cesium Compound A photograph of the trapping agent after trapping cesium compound is shown in FIG. 1.

A volatile cesium compound obtained from cesium iodide (CsI) by using an experimental equipment for gas exhaust was trapped into the trapping agent of working example 1 at 10 cm/sec, 600, 3 hours under air atmosphere. (working example 2)

As shown in FIG. 1, the cesium compound is trapped in the porous spherical shape filter.

Experiment Example 2

Measuring Amount of the Trapped Gaseous Cesium According to Temperature

Figure 2:
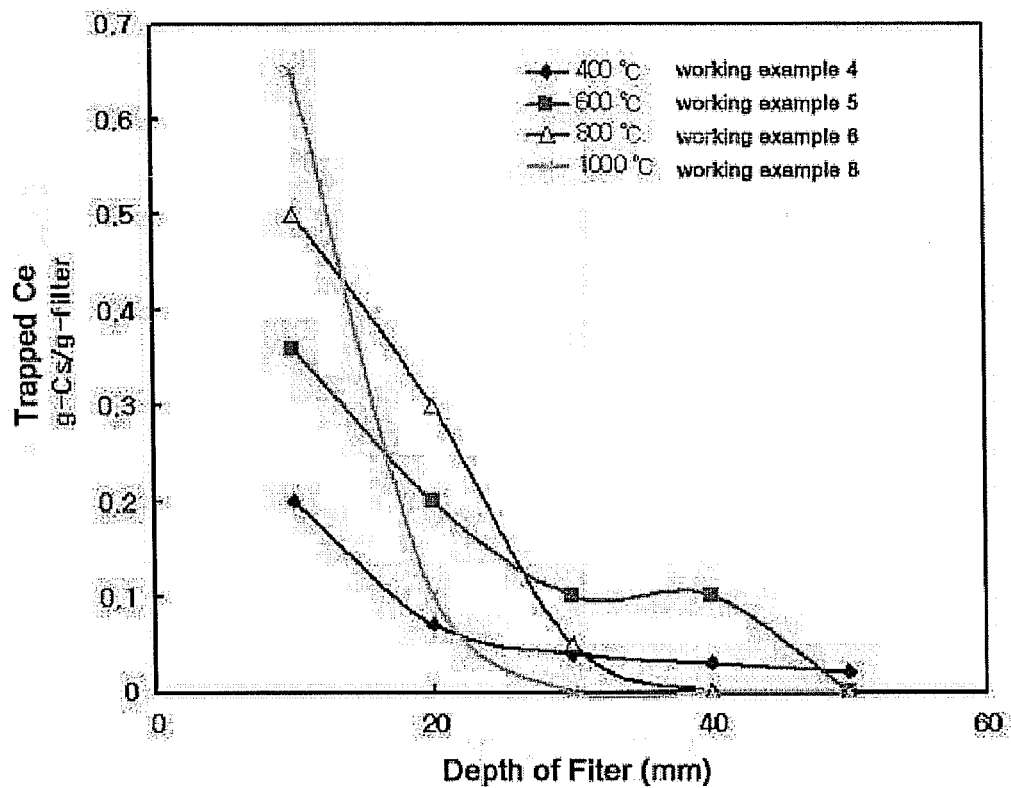
FIG. 2 is a graphical representation plotting the quantities of cesium compound trapped at 400, 600, 800, and 1000 respectively, for 3 hours under air atmosphere, using the trapping agent according to fourth to eighth embodiments.

Amount of the trapped gaseous cesium according to temperature has been measured, and the result is shown in FIG. 2.

Gaseous cesium was obtained from 45 g of $CsNO_3$ by using an experimental equipment for gas exhaust at 20 cm/sec and 1000 in a volatile zone, and trapped into the trapping agent located in a trapping zone of the working example 1 at 400 (working example 4), at 600 (working example 5), at 800 (working example 6), and at 1000 (working example 8) respectively, for 3 hours.

As shown in FIG. 2, more cesium is trapped at the lower filter depth at higher temperature.

Experiment Example 3

Analyzing Shape of Trapping Agent Produced after Trapping Cesium Compound

Figure 3:
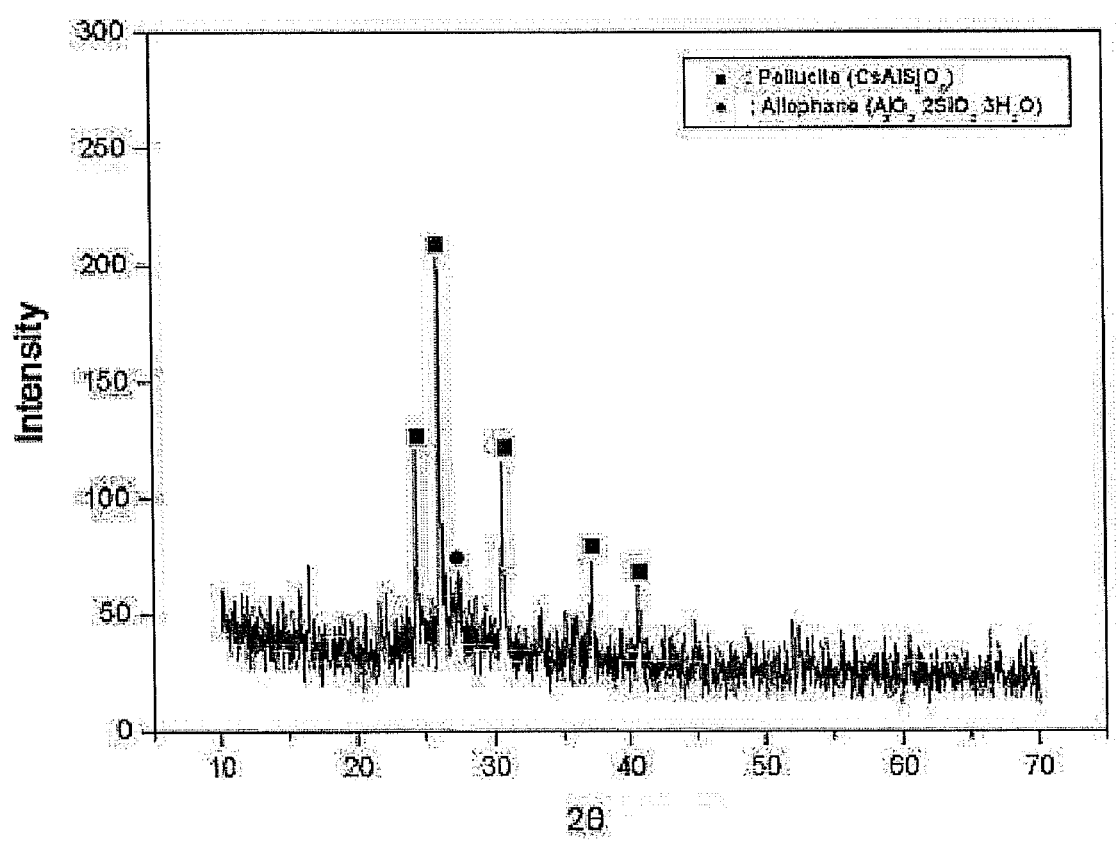
FIG. 3 is a graphical representation of analyzing X-ray diffraction (XRD) of a filter after trapping cesium compound at 900, under air atmosphere, using a trapping agent according to a third embodiment.

X-ray diffraction (XRD, Simens, D-5000) analysis was performed to analyze shape of trapping agent after trapping cesium compound and the result is shown in FIG. 3.

Shape of the trapping agent was analyzed after a volatile cesium compound obtained from cesium iodide (CsI) by using an experimental apparatus for gas exhaust was trapped into the trapping agent of the working example 1 at 20 cm/sec and 900, for 3 hours under air atmosphere (working example 3).

As shown in FIG. 3, the XRD indicates the formation of pollucite ($CsAlSi_2O_6$).

Experiment Example 4

Comparing Amount of the Trapped Cesium Compound Depending on Trapping Agents

Figure 4:
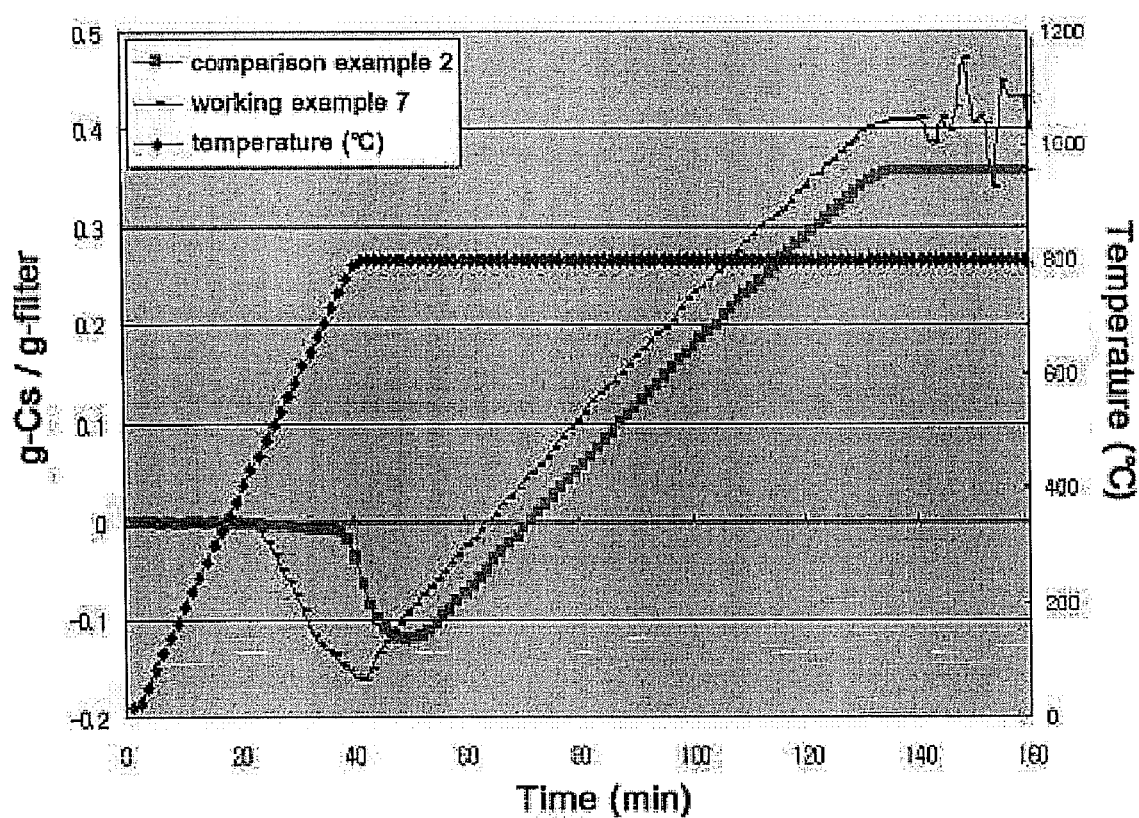
FIG. 4 is a graphical representation of amounts of the cesium trapped analyzed by a thermogravimetry analyzer, by using a trapping agent according to a first embodiment and by a conventional trapping by a conventional trapping agent (comparison example 1) with mole ratio of Si/Al=2.

Thermogravimetry analyzer (TGA, Setaram 92-12) was used to compare amount of the trapped cesium compound in the trapping agent with mole ratio of Si/Al=2.0 (comparison example 1) and the trapping agent including silica, alumina, iron oxide, molybdenum oxide, chromium oxide, and vanadium oxide (working example 2), and the analysis result is shown in FIG. 4.

$CsNO_3$ reagent was used as a source of gaseous cesium, and heated the $CsNO_3$ reagent up to 800 at temperature elevation rate of 20/min under air atmosphere and thermogravimetry analysis was performed while maintaining the same temperature.

As shown in FIG. 4, reaction rate of trapping cesium compound using the working example 1 (working example 7) was increased by 1.5 times than that of trapping cesium compound using the comparison example 1 (comparison example 2)

What is claimed is:

1. A trapping method for volatile cesium compound produced by a nuclear fuel manufacturing process, comprising contacting a trapping agent including silica 40-65% by weight of silica, 15-30% by weight of alumina, 5-15% by weight of iron oxide, 1-15% by weight of molybdenum oxide, 1-10% by weight of chromium oxide, and 1-10% by weight of vanadium oxide with the volatile cesium compound.

2. The method of claim 1, wherein only the cesium compound is selectively trapped by contacting the trapping agent with the volatile gaseous cesium compound at temperature range of 400-1200° C. and fixing the cesium compound as a pollucite.

3. The method of claim 1, wherein the nuclear fuel manufacturing process comprises a spent fuel treatment process at high temperature, a solidification process, a fluoride manufacturing process, a chloride manufacturing process, a nitride manufacturing process, or a dry process.

4. The method of claim 1, wherein the trapping agent is formed as a solid filter.

5. The method of claim 1, wherein the solid filter takes a form of ceramic foams, porous spheres or cylinders.

6. The method of claim 1, wherein the trapping agent is manufactured by being calcinated at temperature ranging between 1200 and 1500° C.

7. The method of claim 2, wherein the pollucite is represented by a chemical formula of $CsAlSi_2O_6$.

* * * * *